United States Patent
Cao et al.

(10) Patent No.: US 9,577,301 B2
(45) Date of Patent: Feb. 21, 2017

(54) DIELECTRIC PHASE-SHIFT MODULE AND PHASE-SHIFT UNIT THEREOF, FEEDING NETWORK AND ANTENNA

(71) Applicant: COMBA TELECOM SYSTEM (CHINA) LTD., Guangdong (CN)

(72) Inventors: Ming Cao, Guangzhou (CN); Peitao Liu, Guangzhou (CN); Shanqiu Sun, Guangzhou (CN)

(73) Assignee: COMBA TELECOM SYSTEM (CHINA) LTD., Guangzhou (CN)

( * ) Notice: Subject to any disclaimer, the term of this patent is extended or adjusted under 35 U.S.C. 154(b) by 18 days.

(21) Appl. No.: 14/765,777

(22) PCT Filed: Jan. 16, 2014

(86) PCT No.: PCT/CN2014/000046
§ 371 (c)(1),
(2) Date: Aug. 4, 2015

(87) PCT Pub. No.: WO2014/117635
PCT Pub. Date: Aug. 7, 2014

(65) Prior Publication Data
US 2015/0372362 A1    Dec. 24, 2015

(30) Foreign Application Priority Data
Feb. 4, 2013 (CN) .......................... 2013 1 0043728

(51) Int. Cl.
*H01Q 1/50* (2006.01)
*H01P 1/18* (2006.01)
(Continued)

(52) U.S. Cl.
CPC ................ *H01P 1/184* (2013.01); *H01Q 1/50* (2013.01); *H01Q 3/32* (2013.01); *H04B 1/18* (2013.01)

(58) Field of Classification Search
CPC .............. H01Q 3/32; H01Q 1/50; H04B 1/18; H01P 1/184
(Continued)

(56) References Cited

U.S. PATENT DOCUMENTS

| | | | | |
|---|---|---|---|---|
| 5,440,318 | A | * | 8/1995 | Butland .................. H01Q 3/20 342/375 |
| 7,358,922 | B2 | * | 4/2008 | Le .......................... H01Q 1/246 343/797 |
| 8,558,739 | B2 | * | 10/2013 | Heinz .................... H01Q 1/125 342/359 |

FOREIGN PATENT DOCUMENTS

| | | |
|---|---|---|
| CN | 102176536 | 9/2011 |
| CN | 102255118 B | 11/2011 |

(Continued)

*Primary Examiner* — Hoanganh Le
(74) *Attorney, Agent, or Firm* — Roy Gross; The Roy Gross Law Firm, L

(57) ABSTRACT

A feeding network is realized by dielectric phase shifting module. The module includes a dielectric device into which interlayer space is defined, a first conductor and a second conductor disposed side by side into the interlayer space and a third conductor located outside of the interlayer space and connected, at different locations, to one end, located at a same side, of each of the first and second conductors. Another end of the first conductor is defined as an input end, while another end of the second conductor and any end of the third conductor are all defined as output ends. The dielectric device is configured to slide along a longitudinal direction of the first and second conductors under external force so as to change phase of signals fed in from the input end and fed out from the output ends. Two dielectric phase-shift modules constitute a phase-shift unit thereof.

31 Claims, 6 Drawing Sheets

(51) Int. Cl.
*H01Q 3/32* (2006.01)
*H04B 1/18* (2006.01)

(58) Field of Classification Search
USPC .................................................. 343/850, 852
See application file for complete search history.

(56) References Cited

FOREIGN PATENT DOCUMENTS

| | | |
|---|---|---|
| CN | 102570033 A | 7/2012 |
| CN | 103094689 A | 5/2013 |
| JP | H10290101 A | 10/1998 |

\* cited by examiner

DIELECTRIC PHASE-SHIFT MODULE AND PHASE-SHIFT UNIT THEREOF, FEEDING NETWORK AND ANTENNA

FIELD OF THE INVENTION

The present invention relates to antenna and more particularly, to a feeding network used for the antenna, especially relates to a phase-shift unit used therein and a dielectric phase-shift module forming the phase-shift unit.

BACKGROUND OF THE INVENTION

Electrically adjustable antenna technology is a common demand for present mobile communications system. This technology suitably changes phase of respective radiation elements of an antenna array by a phase shifter so as to adjust vertical beam steering of a base station antenna, thereby controlling application range of the base station. A phase shifter generally is capable of distributing an input signal into several branch output ports. Phase differences among these output ports may be regulated in ratio. With rapid development of mobile communications technology, the phase shifter should be designed to meet higher requirement. For example, it is required to have better broadband match performance, occupy even small space and so on. Extensive and various researches have been conducted by many researchers and designers to obtain a phase shifter with better performance and more effective structure.

By research and during development of the current invention, the inventor has found following problems in prior art.

U.S. Pat. No. 5,949,303 has disclosed a phase shifting method realized by moving a dielectric element 2 along a feeding network 1 of zigzag circular path. As shown in FIG. 1, when the zigzag circular path includes much more branch paths, as the edges of dielectric element intersect the feeding network at several locations, it has adverse effect on reduction of reflection signals and design of component with wide frequency band response. Moreover, the dielectric element covering respective branch paths must be moved simultaneously. As a result, the entire structural reliability and phase shifting accuracy of the phase shifter and transmission construction will be reduced. CN1547788A discloses a phase shifting device where phase shifting is realized by movement of an integral elongated dielectric plate disposed inside the device. The principle underlying this patent is similar to that of U.S. Pat. No. 5,949,303. Here, phase shift among several ports is achieved using multiple zigzag circular paths. In addition to difficulty in design of component with wide frequency band response such as ultra wide band phase shifter working at frequency range of 1710-2690 MHz, the phase shifting device located at the same plane and with multiple ports also occupies much space of the antenna, thus resulting in difficulty in reduce size of the antenna.

US20020030560 avoids above disadvantages but it employs a pie-shaped dielectric block 3 formed by sintering two dielectric pieces with different dielectric constant, as shown in FIG. 2. However, it suffers from drawbacks such as high manufacture cost, low production efficiency, thus being unsuitable for extensive application in industry. Moreover, to shift phase, pie-shaped dielectric block must take structure of rotatory transmission. As is well known, rotatory transmission structure is more complex than transmission structure of straight pulling type, thereby further limiting its application.

SUMMARY OF THE INVENTION

One object of the invention is to provide a feeding network with simple construction, good electric performance, easy assembling and use.

Another object of the invention is to provide a dielectric phase shifting module capable of realizing modular optional configuration.

A further objection of the instant invention is to provide a phase shifting unit for making modular use of the aforementioned dielectric phase shifting module.

The present invention is realized by following technical solution.

The invention is directed to a feeding network including a phase shifting unit and a power divider network.

The phase shifting unit includes at least two dielectric phase shifting modules assembled with and secured to each other. Each of the dielectric phase shifting module includes a dielectric device into which interlayer space is defined, a first and second conductors disposed side by side into the interlayer space and a third conductors located outside of the interlayer space and connected, at different locations, to one end, located at a same side, of each of the first and second conductors; another end of the first conductor is defined as an input end, while another end of the second conductor and any end of the third conductor are all defined as output ends; the dielectric device is configured to slide along a longitudinal direction of the first and second conductors under external force so as to change phase of signals fed in from the input end and fed out from the output ends; and phase of signals fed out from the output end of the second conductor is determined by sum of phase change generated when the signals pass through the first conductor and phase change generated when the signals enter into the second conductor.

Said power divider network is used for distributing signals to input ends of respective phase shifting modules of the phase shifting unit.

The current invention also relates to a dielectric phase shifting module which includes a dielectric device into which a interlayer space is formed, a first and second conductors disposed side by side into the interlayer space and a third conductor located outside of the interlayer space and connected, at different locations, to one end, located at a same side, of each of the first and second conductors; another end of the first conductor is defined as an input end, while another end of the second conductor and any end of the third conductor are all defined as output ends; the dielectric device is configured to slide along a longitudinal direction of the first and second conductors under external force so as to change phase of signals fed in from the input end and fed out from the output ends; and phase of signals fed out from the output end of the second conductor is determined by sum of phase change generated when the signals pass through the first conductor and phase change generated when the signals enter into the second conductor.

The instant invention also involves a phase shifting unit as introduced above.

The instant invention also involves an antenna including several signal transmission elements, and a feeding network as mentioned above.

Compared to prior art, the present invention brings the following good effects.

At first, by placement of the first and second conductors into the interlayer space defined by the dielectric device, and placement of the third conductor out of the interlayer space, various phase shifting effects are obtained by sliding of the dielectric device on the longitudinal direction of the first and second conductors. As the signal input end is defined by one end of the first conductor, whereas the signal output ends are defined by one end of the second conductor and one end of the third conductor, under the same dielectric condition, phase shifting amount of the signals output from the second conductor will be twice as large as the phase shifting amount output from the third conductor, thus forming differential phase relationship. Further, by changing dielectric substance of the dielectric device of the first and/or second conductor, amplitude of phase difference may be changed. Therefore, the invention employs a simple basic construction to forma dielectric phase shifting module with differential phase shifting function. Moreover, this simple construction also guarantees stable structure, better wide frequency matchability, small occupation size, and easy assembling and application.

Secondly, as the invention possesses above advantages, two dielectric phase shifting modules may form a phase shifting unit. Furthermore, one or more such phase shifting units may be combined with a power divider network, thus forming a feeding network with different differential phase shifting effects and being suitable for use in kinds of applications. This also reflects the dielectric phase shifting module of the invention has flexibility in assembling and application.

Lastly, in a feeding network, by adjustment of assembling relation of two dielectric phase shifting modules of a same phase shifting unit, the dielectric devices of the two dielectric phase shifting modules may slide in a same or opposite direction, thus realizing different phase shifting effects, and the user getting desired amount of phase shifting.

DETAILED DESCRIPTION OF THE INVENTION

Detailed description of various embodiments of the invention will be made with reference to accompanied drawings.

Figure 1:
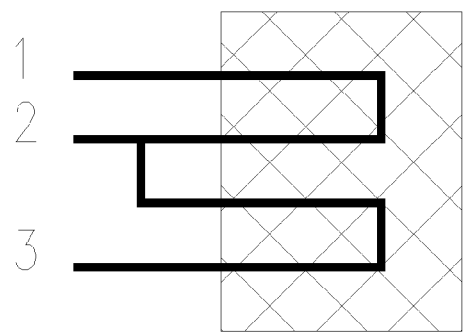
FIG. 1 shows a schematic view of a phase shifting device disclosed in U.S. Pat. No. 5,949,303.
Figure 2:
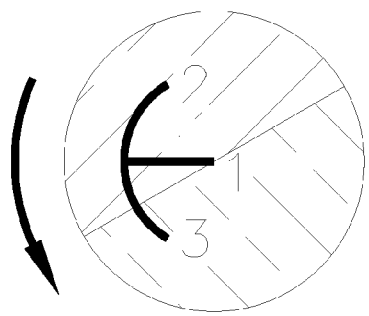
FIG. 2 shows a schematic view of a phase shifting device disclosed in US20020030560.
Figure 3:
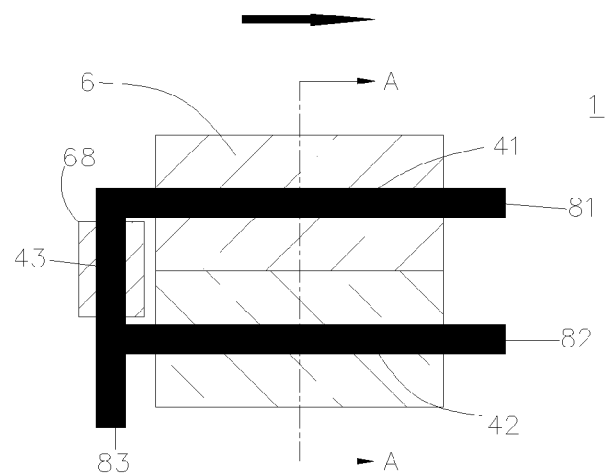
FIG. 3 illustrates a schematic view of a dielectric phase shifting module according to the present invention, with an exterior dielectric device partially removed for showing internal structure.
Figure 4:
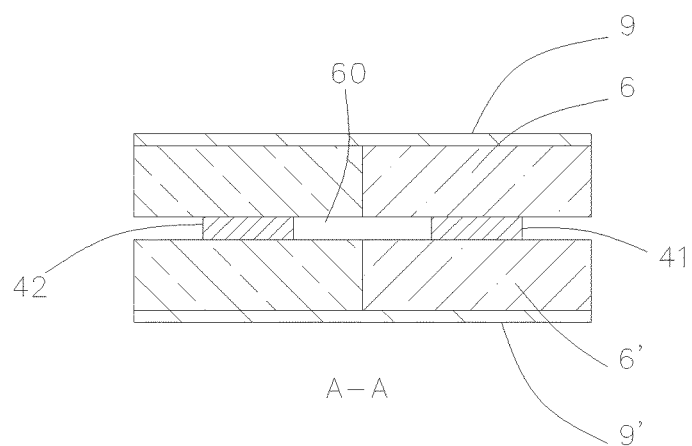
FIG. 4 shows a cross-sectional view along line A-A of the dielectric phase shifting module of FIG. 3 before partial removal of the dielectric device.

Reference is made to FIGS. 3 and 4. A dielectric phase shifting module 1 of the invention is a basic element having a signal input port 81 and two branch signal output ports 82 and 83. The signal is input via the input port 81 and then is fed into the two output ports 82 and 83, and phase difference exists between the output ports 82 and 83. The dielectric phase shifting module 1 includes a dielectric device (6 and 6', the same applies to following description), a dielectric supporting device 68, a pair of metal grounded plates 9, 9', and a first, second and third conductors 41, 42 and 43.

The dielectric device is formed by a pair of dielectric plates 6 and 6' disposed parallel with each other and face to face such that a interlayer space 60 is defined between the two plates. Said conductors 41-43 may be placed inside the interlayer space 60. Of course, formation of the dielectric device may not be limited to two separate dielectric plates. Indeed, it can be constructed of an integral rectangular plate in which a rectangular interlayer space 60 may be defined to realize equivalent function, as is well known by person of the art. In this embodiment, the dielectric device entirely is of a rectangular shape so as to provide rectangular walls for the interlayer space 60 and also provide flat mounting surfaces at its outer sidewall.

Similar to the dielectric device, a interlayer space is also defined in the dielectric supporting device 68 by for example two cleat plates so as to sandwich the third conductor 43 therein. The dielectric supporting device 68 is held in place, and it supports and holds the first, second and third conductors 41, 42, 43 in place. When the dielectric supporting device 68 is absent, the connection location between the third conductor 43 and second conductor 42, is a location where two branch circuits are connected with each other in parallel. Impedance at this location is low, and width of the conductors is large. After placement of the dielectric supporting device 68, the width of the conductors is reduced and space saving is realized while keeping the impedance unchanged. It is noted that the dielectric supporting device 68 is a preferred component other than an indispensable component, and implementation of the current invention is not influenced by it.

Corresponding to two outer surfaces of the dielectric device, the pair of metal grounded plates 9 and 9' is pressed against a pair of flat mounting surfaces provided by the dielectric device. As such, this pair of metal grounded plates 9 and 9' is also arranged face to face and parallel with each other. Accordingly, the metal grounded plates 9 and 9' externally enclose the two dielectric plates 6 and 6' of the dielectric device. Respective conductors 41-43 are received in the interlayer space 60 defined by the two dielectric plates 6 and 6', and this interlayer space 60 also encloses the first conductor 41 and second conductor 42.

Each of the conductors 41-43 is made of strip transmission line in this embodiment, and form strip transmission line structure together with the two metal grounded plates 9 and 9' both of which have a transmission surface parallel with the conductors 41-43. Its radio frequency signals are transmitted in transverse electromagnetic mode (TEM). The conductors 41-43 may be fabricated by stamping or wire-cutting a sheet of conductive material (such as brass plate with certain thickness). Alternatively, they can be printed directly on a PCB. In current invention, by deliberate design of the inventor, each of conductors 41-43 may bring its unique phase shifting effect. Among these conductors 41-43, the first conductor 41 and second conductor 42 are disposed inside the interlayer space 60 side by side and with one sidewall of one conductor parallel with one sidewall of another conductor. By this way, the dielectric device is able to slide back and forth straight along an elongated direction of the first and second conductors 41 and 42. In this embodiment, the first and second conductors 41 and 42 are designed to have the same length and certain physical tolerance in length is allowed, as is known by person of the art. The third conductor 43 is disposed at a periphery of the interlayer space 60 and is located close to respective ends at the same side of the first and second conductors 41, 42. One end (non-free end) of the first conductor 41 is connected with one end (non-free end) of the third conductor 43, while a corresponding end (non-free end) of the second conductor 42 is connected to a middle portion of the third conductor 43. Detailed connection manner of the second and third conductors 42, 41 with the third conductor 43 may not be limited to the embodiment in question, and may have other connection location. Therefore, a free end (non-connected end, this definition applies also to description below) of the first conductor 41 is referred as to a signal input port 81 through which signals are fed, while free ends of the second and third conductors 42, 43 are referred as to signal output ports 82 and 83 respectively. For convenient description, sliding of the dielectric device from the non-free ends of the first and second conductors 41, 42 to the free ends thereof is defined as forward sliding (the same with transmission direction of signals through the second conductor 42), and sliding of the dielectric device from the free ends of the first and second conductors 41, 42 to the non-free ends thereof is defined as backward sliding (the same with transmission direction of signals through the first conductor 41). Apparently, the sliding of the dielectric device is confined basically in the longitudinal direction of the first and second conductors. The detailed operation principle of the dielectric phase shifting module 1 of the current invention is analyzed below.

Suppose the electric length of a transmission line with a length L and filled with air dielectric is $\theta_1 = 2\pi L/\lambda$, and is $\theta_2 = 2\pi\sqrt{\varepsilon_r} L/\lambda$ when filled with dielectric of dielectric constant $\varepsilon_r$. The difference between the two electric lengths is $\Delta\theta = \theta_2 - \theta_1 = 2\pi(\sqrt{\varepsilon_r}-1)L/\lambda$, where, $\lambda$ is working wavelength of signals. Once the dielectric plates 6 and 6' of the dielectric device moves in the feeding network, the value of L will be changed, and accordingly, $\Delta\theta$ also linearly changes, thus realizing phase shifting. It is noted further that with other condition unchanged, greater dielectric constant $\varepsilon_r$ will result in larger amount of phase shift.

For the same transmission path, when the dielectric plates 6 and 6' having dielectric constant $\varepsilon_{r1}$ moves a distance of L, amount of phase shift obtained at the signal output port will be $-\Delta\theta$. Here, to obtain amount of $-2\Delta\theta$ (minus represents phase delay of radio frequency signal), movement distance may be increased to 2L, or dielectric constant of the dielectric plates 6 and 6' may be changed to $\varepsilon_{r2}$. In addition, $\varepsilon_{r1}$ and $\varepsilon_{r2}$ meet the followed relationship:

$$\frac{\sqrt{\varepsilon_{r1}}-1}{\sqrt{\varepsilon_{r2}}-1} = \frac{1}{2}, \text{ i.e. } \varepsilon_{r1} = \left(\frac{\sqrt{\varepsilon_{r2}}+1}{2}\right)^2$$

The above description is related to basic principle of radio frequency signals. However, when the signal system has multiple signal output ports, realization of stepped changes among respective ports only by dielectric constant will require kinds of materials or complicated machining process, thus bringing difficulty in production in large scale.

To reduce difficulty and cost, the dielectric phase shifting module 1 of the invention uses simpler construction. The connection length of the first conductor 41 providing the signal input port 81 is L0, and signals enter into the third conductor 43 after being transmitted out of the first conductor 41. Through a connection point between the third conductor 43 and second conductor 42, the signals enter into a 2-way power divider formed together by the second conductor 42 and third conductor 43. One way of signals are transmitted to the signal output port 83 directly through the third conductor 43, while the other way of signals arrive at the signal output port 82 through the second conductor 42 having a length of L1. According to above configuration and electric principle, phase adjustment of the dielectric phase shifting module 1 of the invention is realized by following means.

1. After dielectric constant is changed to $\varepsilon_{r2}$ and the dielectric device moves a distance L, along a path beginning from the signal input port 81 and ending at the output port 82, there are twice dielectric movements each having a length L, each dielectric movement results in phase change of $-2\Delta\theta$. As a result, phase shift amount of $-2\Delta\theta$ is obtained at the output port 83, while phase shift amount of $-4\Delta\theta$ is obtained at the output port 82.

Figure 5:
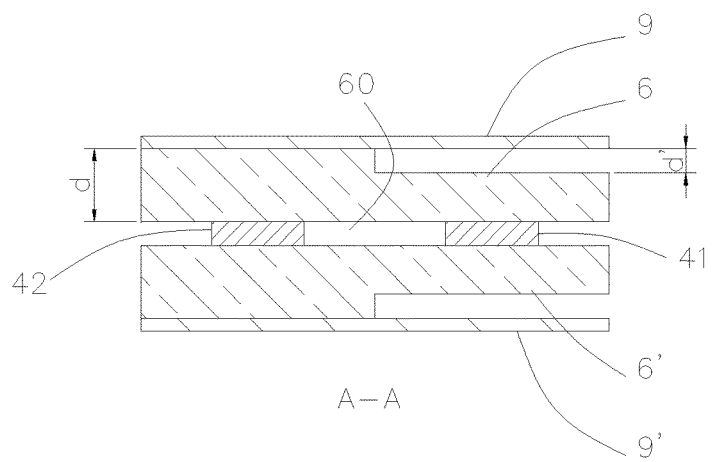
FIG. 5 denotes a plan view based on the dielectric phase shifting module of FIG. 4 with partial removal of the dielectric device for changing dielectric substance.

2. With reference to FIG. 5, it is assumed that dielectric substance of the dielectric plates 6 and 6' at a location corresponding to the first conductor 41 has been changed (to dielectric and air) by for example removal of partial material from corresponding location of the dielectric plates 6 and 6'. Therefore, the sliding distance of the dielectric (corresponding to the first conductor 41) with dielectric constant $\varepsilon_{r1}$ along L0 is L, and the sliding distance of the dielectric (corresponding to the second conductor 42) with dielectric constant $\varepsilon_{r2}$ along L1 is also L. Accordingly, along a path beginning from the signal input port 81 and ending at the output port 82, there are twice dielectric movements each having a length L, dielectric movements result in phase change of $-\Delta\theta$ and $-2\Delta\theta$ respectively. Here, phase shift amount of $-\Delta\theta$ is obtained at the output port 83, while phase shift amount of $-3\Delta\theta$ is obtained at the output port 82.

3. Maintain dielectric constant and dielectric substance of the dielectric device unchanged. The dielectric with dielectric constant $\varepsilon_{r1}$ slides a distance L along the first conductor 41 and second conductor 42. along a path beginning from the signal input port 81 and ending at the output port 82, there are twice dielectric movements each having a length L, each dielectric movement results in phase change of −Δθ. As a result, phase shift amount of −Δθ is obtained at the output port 83, while phase shift amount of −2Δθ is obtained at the output port 82.

Considering above three situations, as a fundamental component, the dielectric phase shifting module 1 of the invention is suitable for employing dielectric complying with two kinds of dielectric constant and three-port feeding network design. It is clear that three-port feeding network design may achieve various kinds of phase shifting ranging from −Δθ to −4Δθ. By combinative use of various networks, continuous stepped phase shift changes may be provided to a network with 2-9 output ports.

To further reduce material requirement and production cost of design, the structure of FIG. 5 may be realized using a method below. The dielectric device may have different dielectric constant at different locations thereof (respective locations along vertical direction of this figure) corresponding to different conductors. Each of the dielectric plates 6 and 6' with $\in_{r2}$ may be seemed to contain two regions corresponding to respective first and second conductors 41 and 42. Here, no machining is performed to a region of each of the dielectric plates 6 and 6' corresponding to the second conductor 42 and this region constitutes entire filling dielectric of the strip line. Another region corresponding to the first conductor 41 is cut along its thickness direction, and filling dielectric of the strip line is mixture of air and dielectric. To obtain equivalent dielectric constant $$\varepsilon_{r1} = \left(\frac{\sqrt{\varepsilon_{r2}} + 1}{2}\right)^2$$

in the region corresponding to the second conductor 42, it is only required to adjust relative thickness of air layer and it is obtained by high frequency simulation software.

It is manifest that the instant invention has provided the dielectric phase shifting module 1 with a fundamental construction. In addition, different signal phase output manner are also provided. By using different implementation manners, phase from the input port 81 to the two output ports 82, 83 may be changed under constant ratio for example 1:2, 1:3, 2:3, or the like. After several dielectric phase shifting modules 1 are connected via a power divider network, the dielectric device may be pushed or pulled along the longitudinal direction of the first and second conductors 41, 42 by a transmission structure of straight pulling type (not shown) known by person of the art. Phase may be adjusted with equal ratio among various output ports (such as 2-9 ports). Based on these characteristics, by formation of multiple dielectric phase shifting modules 1 on a multiple-layered structure, the entire structure is simple and compact, thus realizing a phase shifting unit and, further realizing a feeding network with flexibly configurable ports.

Figure 6:
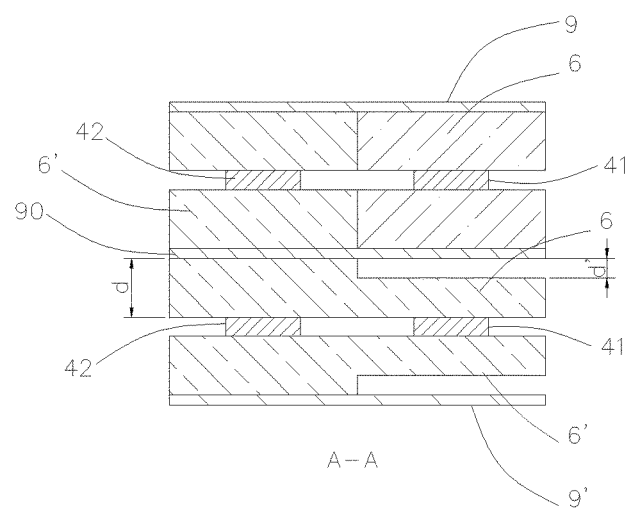
FIG. 6 shows a cross-sectional view of a phase shifting unit constructed of two inventive dielectric phase shifting modules.

With reference to FIG. 6, the phase shifting unit according to the invention is constructed in accordance with the dielectric phase shifting modules 1, and may be implemented by kinds of manners.

At first, it may be realized by assembling and securing together two dielectric phase shifting modules 1 which have identical structure and electric performance. The two dielectric phase shifting modules 1 are arranged so as that their respective interlayer spaces 60 are parallel with each other. Moreover, the third conductors 43 of the dielectric phase shifting modules 1 are located at the same side. Specifically, they are located at a same side of a sliding path of the dielectric device. In this situation, one of metal grounded plates 9 and 9' may not be necessary. In other words, the two dielectric phase shifting modules 1 share a metal grounded plate 90 at location where they face to each other, thus forming upper and lower cavities. Compared to a single-layered structure, this structure is more simple and compact and may effectively save space and reduce size of the antenna, as shown in FIG. 6. Mechanical connection manner known by person of the art may be used to link the dielectric devices of the two dielectric phase shifting modules 1 together such that when one dielectric device slides on its sliding path along a forward direction (or backward direction), the other dielectric device will also slides simultaneously on its sliding path along the forward direction (or backward direction). As such, synchronous phase shifting is realized for the two dielectric phase shifting modules 1 with the same amount of phase shifting.

Secondly, improvement may be made upon the aforementioned first realizing manner and synchronous linkage may be maintained. The difference lies in sliding direction of the two dielectric phase shifting modules 1. Along the sliding path direction, the third conductor 43 of one dielectric phase shifting module 1 locates at one side of the sliding path, while the third conductor 43' of the other dielectric phase shifting module 1 locates at the other side of the sliding path (See FIG. 7). Consequently, when the dielectric device of one dielectric phase shifting module 1 is driven to slide on the sliding path in a forward direction, the dielectric device of the other dielectric phase shifting module 1 is synchronously driven to slide on the sliding path in a backward direction, and vice versa. It is noted that the forward and backward directions as used herein both mean sliding direction on the sliding path, i.e., the longitudinal direction of the first conductor 41 and second conductor 42. In terms of spatial location, the above two dielectric phase shifting modules 1 may be superimposed together, or arranged side by side, or arranged in other known mechanical manner. No matter what kind of structure is used to assemble the two dielectric phase shifting modules 1 together, no creative labor will be required by person of the art to make opposite linkage design of the several dielectric phase shifting modules.

Thirdly, different from above two kinds of realizing manners, a third and fourth manners may be such that the two dielectric phase shifting modules are placed on a same virtual reference axis, kept close to each other, and are symmetrical to each other. Alternatively speaking, the third conductors 43 of two dielectric phase shifting modules 1 may both locate at proximal sides or distal sides thereof. The dielectric devices of the two dielectric phase shifting modules 1 may be coupled with each other by an external element. Namely, the two dielectric devices may be driven synchronously and along the same direction by the external element. Further, the dielectric devices of the two dielectric phase shifting modules 1 may be formed integrally, and thus two interlayer spaces 60 are merged. In this case, two groups of conductors of the two dielectric phase shifting modules 1 are able to be inserted into the merged interlayer space 60 from two sides thereof. It is noted that the two third conductors should be disposed at outer sides of the interlayer space 60.

Based on above combination manners of the two dielectric phase shifting modules 1, various assembling relationships may be obtained by any known means. Moreover, not only two dielectric phase shifting modules 1, but also more than two dielectric phase shifting modules 1 may be combined to form a phase shifting unit. In addition, linked control and synchronous differential phase shifting effect may be obtained for each phase shifting unit by moving only one functional component.

More complicated feeding network may be produced using multiple above separate dielectric phase shifting modules 1 or one or more aforementioned phase shifting units. Hereinafter, various examples will be given to this kind of feeding network.

Figure 7:
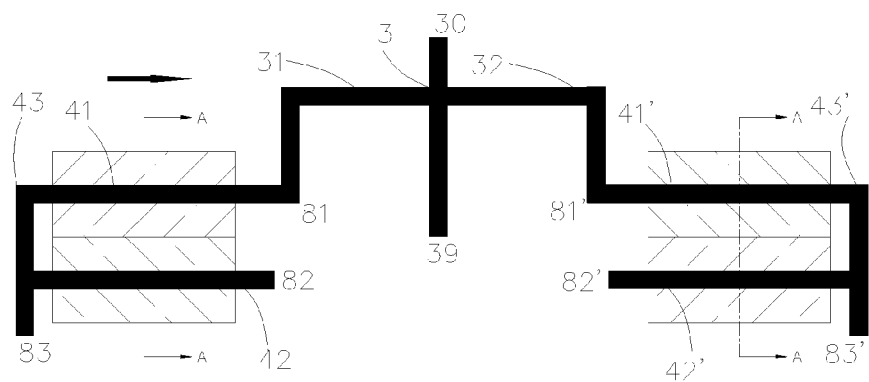
FIG. 7 shows a view illustrating principle of a feeding network employing the dielectric phase shifting modules of the invention, with exterior dielectric devices of respective dielectric phase shifting modules removed to show interior structure, the network having six signal output ports.

As shown in FIG. 7 illustrating a feeding network with six signal ports. This network includes two dielectric phase shifting modules 1 by which a phase shifting unit may be formed with aforementioned second or third realizing manner. Or, the two dielectric phase shifting modules 1 may be driven independently of each other while are controlled to slide synchronously. On the basis of the two dielectric phase shifting modules 1, a power divider network 3 is added to the feeding network. Said network 3 is a power distribution network for distribute a source signal onto signal input ports of respective dielectric phase shifting modules 1 with equal power.

In this embodiment, the power divider network 3 has a general input port 30 and several output ports correspondingly connected to signal input ports 81 and 81' of respective dielectric phase shifting module 1. In addition, another output port 39 is directly depended upon the general input port 30. Two branch circuits 31 and 32 of the power divider network 3 are connected to the signal input ports 81 and 81' of the two dielectric phase shifting modules 1. The dielectric devices of the two dielectric phase shifting modules 1 are driven to slide from left to right along a direction indicated therein. At this time, when the area of dielectric covered on the first conductor 41' and second conductor 42' of the right dielectric phase shifting module 1 is increased, the area of dielectric covered on the first conductor 41 and second conductor 42 of the left dielectric phase shifting module 1 is decreased. As such, phase from the general input port 30 to the output port 39 is unchanged, phase changes from the general input port 30 to respective signal output ports 82, 83, 39, 83', and 82' meet ratios of 2:1:0:−1:−2, thus constituting an entire feeding network which can accommodate phase shifting requirement of antenna system having five or equivalently five radiation units.

Figure 8:
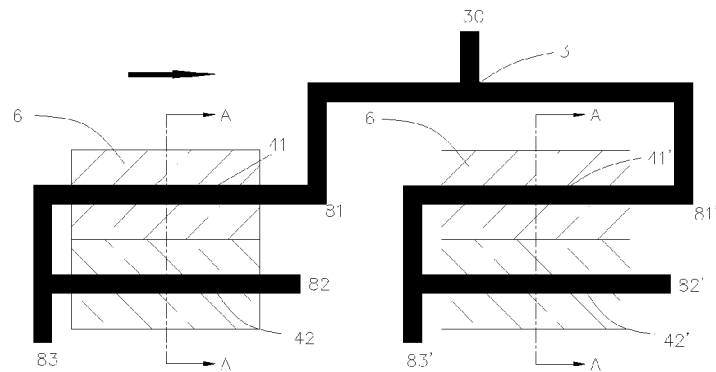
FIG. 8 shows a view illustrating principle of another feeding network employing the dielectric phase shifting modules of the invention, with exterior dielectric devices of respective dielectric phase shifting modules removed to show interior structure, the network having five signal output ports.

As shown in FIG. 8 illustrating a feeding network with five signal ports. The power divider network 3 is identical to that as shown in FIG. 7 in structure. However, there is no output port 39 directly dependent upon the general input port 30. The two dielectric phase shifting modules 1 of this feeding network have different implementation manners. The dielectric plates 6, 6' around the first conductor 41 and second conductor 42 respectively of one dielectric phase shifting module 1 are completely filled with material of the dielectric plates 6, 6' themselves (See FIG. 4), while the dielectric plates 6, 6' around the first conductor 41' and second conductor 42' respectively of another dielectric phase shifting module 1 are cut partially (See FIG. 5). The two dielectric phase shifting modules 1 are assembled together using the first realizing manner described above regarding phase shifting unit or other flexible manner in order that when the dielectric devices of the two dielectric phase shifting modules 1 are driven, the two devices will slide along aforementioned forward direction (or backward direction).

With reference to FIG. 5 showing dielectric devices of the two dielectric phase shifting modules 1, their dielectric plates 6 and 6' both have dielectric constant $\in_{r1}$. Here, region of the dielectric plates 6 and 6' of the second dielectric phase shifting module 1 covering the first conductor 41' are cut along their thickness direction so as to reduce dielectric thickness d' and d. Accordingly, air and dielectric are mixed in this region to get the dielectric constant $\in_{r2}$. In addition, they meet the equation below:

$$\varepsilon_{r2} = \left(\frac{\sqrt{\varepsilon_{r1}} + 1}{2}\right)^2$$

Here, d' and d may be determined by simulation software of high frequency circuit.

During moving course of the dielectric devices, identical phase change will occur on the first and second conductors 41, 42 of the first dielectric phase shifting module 1 and second conductor 42' of the second dielectric phase shifting module 1. The ratio of above phase change relative to that of the first conductor 41' of the second dielectric phase shifting module 1 is 2:1, while phase changes from the general input port 30 to respective signal output ports 83', 83, 82' and 82 meet ratio of 1:2:3:4. As such, in this embodiment, the feeding network can accommodate phase shifting requirement of antenna system having 4-5 or equivalently 4-5 radiation units.

Figure 9:
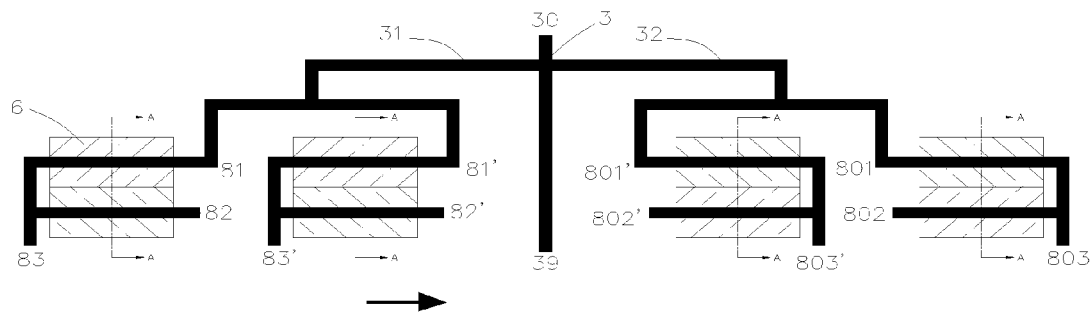
FIG. 9 shows a view illustrating principle of a further feeding network employing the dielectric phase shifting modules of the invention, with exterior dielectric devices of respective dielectric phase shifting modules removed to show interior structure, the network having ten signal output ports.

As shown in FIG. 9 illustrating a feeding network with ten ports. It employs two phase shifting units or four dielectric phase shifting modules 1 driven separately or linked together by other manner. Branch circuits 31 and 32 of the feeding network are opposite to each other and perform shunting. The dielectric devices of the four dielectric phase shifting modules 1 move from left to right along a direction indicated in the figure, this being realized using two standard phase shifting elements formed by the first realizing manner as aforementioned. In addition, the dielectric devices of the two standard phase shifting elements slide in opposite directions and are linked together. As a result, when the area of dielectric covered on the first conductors 41 and second conductors 42 of the left dielectric phase shifting modules 1 is increased, the area of dielectric covered on the first conductors and second conductors of the right dielectric phase shifting modules 1 is decreased. As such, phase from the general input port 30 to the output port 39 is unchanged, while phase changes from the general input port 30 to respective signal output ports 82, 82', 83, 83', 39, 803', 803, 802' and 802 meet ratios of 4:3:2:1:0:−1:−2:−3:−4, thus constituting an entire feeding network which can accommodate phase shifting requirement of antenna system having nine or equivalently nine radiation units.

The above, three, five, six, and ten-port feeding networks do not employ entire design of complex segmental zigzag circular path. Rather, this invention creatively connects in parallel several separate dielectric phase shifting modules 1 with different phase shifting ratio together, thus generating continuous phase change of equal ratio. Based on number of the antenna units and design requirement, this kind of design manner makes combination with suitable dielectric phase shifting modules 1 or phase shifting unit constructed of the dielectric phase shifting modules 1, hence effectively reducing design difficulty in multiple ports phase shifting feeding network and improving reliability of the entire feeding network. Moreover, respective dielectric phase shifting modules 1 of the multiple ports phase shifting feeding network may be realized in a multiple layered structure by sharing a metal grounded plate 90, thereby saving space effectively.

Figure 10:
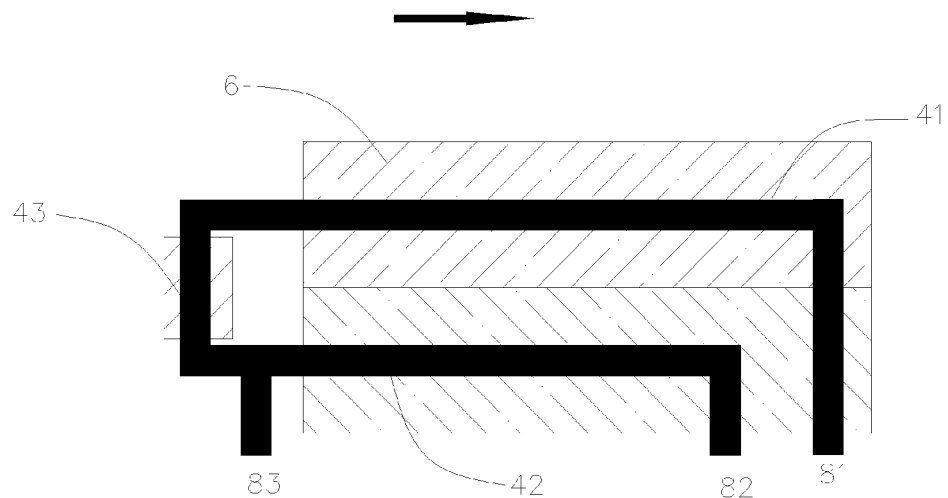
FIG. 10 shows schematic view of another dielectric phase shifting module improved upon structure of FIG. 3, indicating that a third conductor may have zigzag arrangement.

As shown in FIG. 10, upon the embodiment of FIG. 3, further improvements are made. In particular, the third conductor 43 of the dielectric phase shifting module is arranged to have zigzag shape. As such, the signal output port 83 of the third conductor 43 indeed is formed along the longitudinal direction of the second conductor 42. This variation is known by person of the art.

Figure 11:
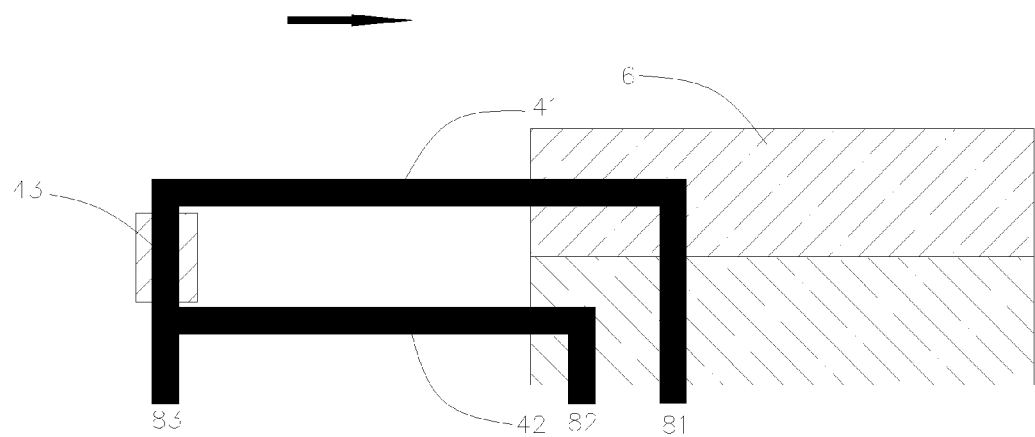
FIG. 11 shows schematic view of a further dielectric phase shifting module improved upon structure of FIG. 3, indicating that a first and second conductors are arranged in a zigzag manner.

Reference is made further to FIGS. 10 and 11. Further optimization may be done upon aforementioned realizing manner of the dielectric phase shifting module. Specifically, free ends of the first conductor 41 and second conductor 42 shown in FIGS. 10-11 are designed to be zigzag such that the signal input port 81 of the first conductor 41 and signal output port 82 of the second conductor 42 are bent so as to be exposed out of another side of the dielectric device 6. Of course, it is also possible to produce zigzag effect for only the first conductor 41 or second conductor 42. Or, the first and second conductors 41, 42 may be zigzag such that they are exposed out of two opposite sides of the dielectric device respectively. Thanks to this improvement, sliding of the dielectric device will be done irrespective of whether the signal input port 81 of the first conductor 41 and signal output port 82 of the second conductor 42 are blocked by the dielectric device 6, thus realizing convenient electrical connection with the exterior.

Figure 12:
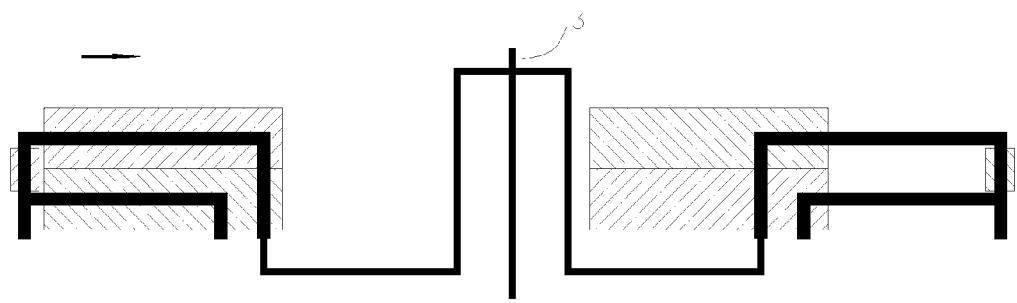
FIG. 12 shows a schematic view of a feeding network built with dielectric phase shifting modules of FIG. 11.
Figure 13:
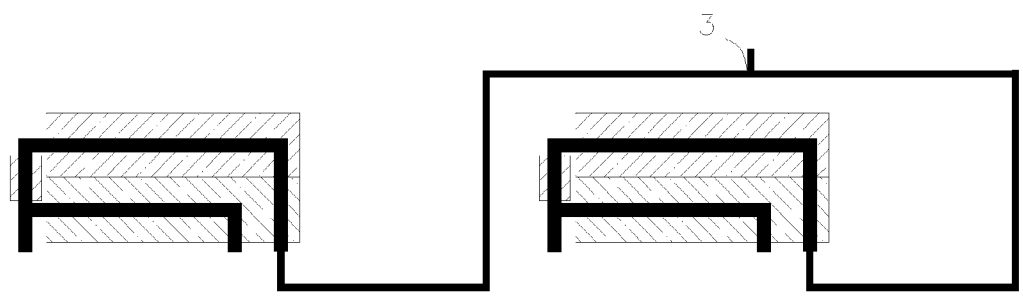
FIG. 13 shows a schematic view of another feeding network built with dielectric phase shifting modules of FIG. 11.

It should be known that in FIGS. 10-11, improvement to the dielectric phase shifting module will not have impact on its function of forming the phase shifting unit. Similarly improvements shown in FIGS. 10-11 may also be used to build a feeding network. Two kinds of feeding networks built with structure of FIG. 11 will be described with reference to FIGS. 12-13. It is seen directly that this two kinds of networks follow the same principle as aforementioned feeding networks. The difference lies only in replacement of the dielectric phase shifting module. That is, the dielectric phase shifting module disclosed in FIG. 3 is replaced by another one shown in FIG. 11. As to power divider network including its output ports and wiring pattern, it is the same as aforementioned feeding networks. Therefore, no further description is made to it.

Figure 14:
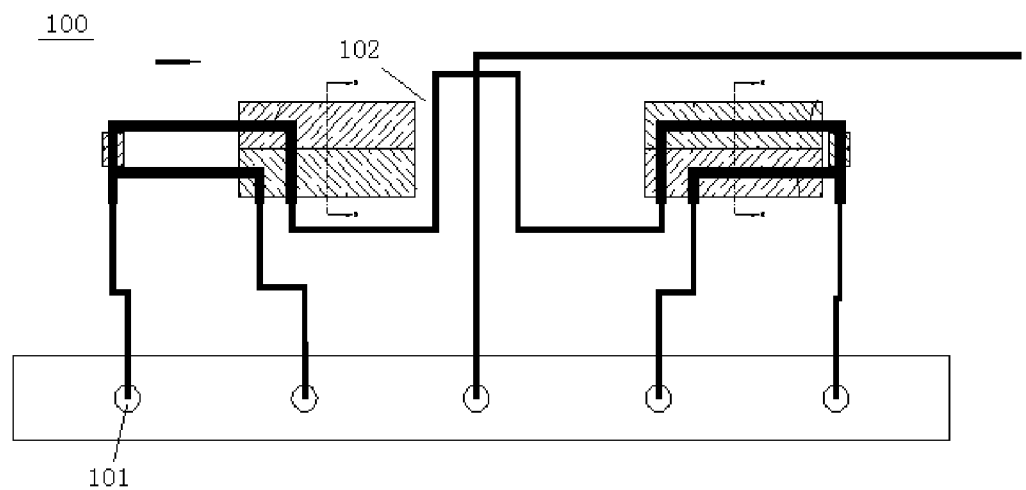
FIG. 14 illustrates application of the feeding network of the invention into an antenna.

In a summary, the current invention provides a dielectric phase shifting module, and further provides corresponding phase shifting unit and multiple port-feeding network. Significant improvements have been made to the dielectric phase shifting module in terms of either structure or electrics. As shown in FIG. 14, an antenna 100 includes several signal transmission elements 101 and said feeding network 102 which is incorporated into the antenna. Take the feeding network of FIG. 12 as an example. Its signal output ports are connected to individual signal transmission elements 101 respectively for providing power to the signal transmission elements 101 of the antenna.

Though various embodiments of the invention have been illustrated above, a person of ordinary skill in the art will understand that, variations and improvements made upon the illustrative embodiments fall within the scope of the invention, and the scope of the invention is only limited by the accompanying claims and their equivalents.

The invention claimed is:

1. A feeding network, comprising a phase shifting unit and a power divider network, wherein:

said phase shifting unit comprises at least two dielectric phase shifting modules assembled with and secured to each other; each of the dielectric phase shifting module comprises a dielectric device into which interlayer space is defined, a first and second conductors disposed side by side into the interlayer space and a third conductor located outside of the interlayer space and connected, at different locations, to one end, located at a same side, of each of the first and second conductors; another end of the first conductor is defined as an input end, while another end of the second conductor and any end of the third conductor are all defined as output ends; the dielectric device is configured to slide along a longitudinal direction of the first and second conductors under external force so as to change phase of signals fed in from the input end and fed out from the output ends; and phase of signals fed out from the output end of the second conductor is determined by sum of phase change generated when the signals pass through the first conductor and phase change generated when the signals enter into the second conductor;

said power divider network is used for distributing signals to input ends of respective phase shifting modules of the phase shifting unit.

2. The feeding network as recited in claim 1, wherein another end of the third conductor opposite to its output end is connected with the first conductor; while the middle portion of the third conductor is connected with the second conductor.

3. The feeding network as recited in claim 1 or 2, wherein the first and second conductors are of the same length and arranged parallel with each other.

4. The feeding network as recited in claim 1, wherein the first conductor is configured to be zigzag relative to itself such that its input end is exposed out of the dielectric device; and the second conductor is also configured to be zigzag relative to itself such that its output end is exposed out of the dielectric device.

5. The feeding network as recited in claim 1 or 4, wherein the third conductor is also configured to be zigzag.

6. The feeding network as recited in claim 1, wherein the dielectric device comprises a pair of dielectric plates arranged face to face and parallel with each other to define said interlayer space.

7. The feeding network as recited in claim 6, wherein an outer sidewall of each dielectric plate is provided with a metal grounded plate; and the two metal grounded plates are arranged face to face and parallel with each other.

8. The feeding network as recited in claim 1, wherein the dielectric devices of respective dielectric phase shifting modules of a same phase shifting unit are configured to be able to move synchronously; and sliding of the dielectric devices of partial dielectric phase shifting modules result in synchronous sliding of the dielectric devices of the rest dielectric phase shifting modules.

9. The feeding network as recited in claim 8, wherein the dielectric devices of respective dielectric phase shifting modules of a same phase shifting unit are configured such that all the dielectric phase shifting modules are able to move synchronously in a forward or backward direction along the longitudinal direction of the first and second conductors.

10. The feeding network as recited in claim 8, wherein the dielectric devices of respective dielectric phase shifting modules of a same phase shifting unit are configured such that partial dielectric phase shifting modules and the rest dielectric phase shifting modules are able to move synchronously in opposite directions along the longitudinal direction of the first and second conductors.

11. The feeding network as recited in claim 8, wherein the dielectric phase shifting modules are superimposed and secured together such that their interlayer spaces are parallel with each other.

12. The feeding network as recited in claim 11, wherein every two adjacent dielectric phase shifting modules of the superimposed dielectric phase shifting modules share a common metal grounded plate at their surfaces facing each other.

13. The feeding network as recited in claim 11, wherein the third conductors of partial dielectric phase shifting modules and the third conductors of the rest dielectric phase shifting modules locate at two sides of a sliding path of the dielectric devices.

14. The feeding network as recited in claim 11, wherein the third conductors of partial dielectric phase shifting modules and the third conductors of the rest dielectric phase shifting modules locate at a same side of a sliding path of the dielectric devices.

15. The feeding network as recited in claim 10, wherein the feeding network comprises two phase shifting units each of which only comprises two dielectric phase shifting modules; and the two phase shifting units are configured such that when the dielectric devices of two dielectric phase shifting modules of one phase shifting unit slide on the longitudinal direction of the first and second conductors in a forward direction, the dielectric devices of two dielectric phase shifting modules of another phase shifting unit will be driven to slide synchronously in an opposite direction.

16. The feeding network as recited in claim 1, wherein the dielectric device of any one of the dielectric phase shifting modules is partially cut at locations corresponding to the first or second conductor.

17. The feeding network as recited in claim 1, wherein signals fed in by the power divider network through the signal input ends of respective dielectric phase shifting modules have the same phase.

18. The feeding network as recited in claim 1, wherein the phase shifting unit only comprises two dielectric phase shifting modules.

19. The feeding network as recited in claim 1, wherein the dielectric phase shifting module further comprises a dielectric supporting device into which a interlayer space is defined to enclose the third conductor and fixedly support the same.

20. An antenna comprising several signal transmission elements, and a feeding network as recited in claim 1, said feeding network providing power to said respective signal transmission elements.

21. A dielectric phase shifting module comprising a dielectric device into which a interlayer space is formed, a first and second conductors disposed side by side into the interlayer space and a third conductor located outside of the interlayer space and connected, at different locations, to one end, located at a same side, of each of the first and second conductors; another end of the first conductor is defined as an input end, while another end of the second conductor and any end of the third conductor are all defined as output ends; the dielectric device is configured to slide along a longitudinal direction of the first and second conductors under external force so as to change phase of signals fed in from the input end and fed out from the output ends; and phase of signals fed out from the output end of the second conductor is determined by sum of phase change generated when the signals pass through the first conductor and phase change generated when the signals enter into the second conductor.

22. The dielectric phase shifting module as recited in claim 21, wherein another end of the third conductor opposite to its output end is connected with the first conductor; while the middle portion of the third conductor is connected with the second conductor.

23. The dielectric phase shifting module as recited in claims 21 or 22, wherein the first and second conductors are of the same length and arranged parallel with each other.

24. The dielectric phase shifting module as recited in claim 21, wherein the first conductor is configured to be zigzag relative to itself such that its input end is exposed out of the dielectric device; and the second conductor is also configured to be zigzag relative to itself such that its output end is exposed out of the dielectric device.

25. The dielectric phase shifting module as recited in claim 21 or 24, wherein the third conductor is also configured to be zigzag.

26. The dielectric phase shifting module as recited in claim 21, wherein the dielectric device comprises a pair of dielectric plates arranged face to face and parallel with each other to define said interlayer space.

27. The dielectric phase shifting module as recited in claim 26, wherein an outer sidewall of each dielectric plate is provided with a metal grounded plate; and the two metal grounded plates are arranged face to face and parallel with each other.

28. The dielectric phase shifting module as recited in claim 21, wherein the first, second and third conductors are all of flat strip shape.

29. The dielectric phase shifting module as recited in claim 21, wherein the dielectric device is partially cut at locations corresponding to the first or second conductor.

30. The dielectric phase shifting module as recited in claim 21, wherein the dielectric phase shifting module further comprises a dielectric supporting device into which a interlayer space is defined to enclose the third conductor and fixedly support the same.

31. A phase shifting unit comprising:
at least two dielectric phase shifting modules assembled with and secured to each other; each of the dielectric phase shifting module comprises a dielectric device into which interlayer space is defined, a first and second conductors disposed side by side into the interlayer space and a third conductor located outside of the interlayer space and connected, at different locations, to one end, located at a same side, of each of the first and second conductors; another end of the first conductor is defined as an input end, while another end of the second conductor and any end of the third conductor are all defined as output ends; the dielectric device is configured to slide along a longitudinal direction of the first and second conductors under external force so as to change phase of signals fed in from the input end and fed out from the output ends; and phase of signals fed out from the output end of the second conductor is determined by sum of phase change generated when the signals pass through the first conductor and phase change generated when the signals enter into the second conductor.

* * * * *